US010746258B2

(12) United States Patent
Hummel

(10) Patent No.: US 10,746,258 B2
(45) Date of Patent: Aug. 18, 2020

(54) DUAL CLUTCH TRANSMISSION FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 511 days.

(21) Appl. No.: 15/551,141

(22) PCT Filed: Jan. 20, 2016

(86) PCT No.: PCT/EP2016/051108
§ 371 (c)(1),
(2) Date: Aug. 15, 2017

(87) PCT Pub. No.: WO2016/131593
PCT Pub. Date: Aug. 25, 2016

(65) Prior Publication Data
US 2018/0017135 A1 Jan. 18, 2018

(30) Foreign Application Priority Data
Feb. 19, 2015 (DE) .......................... 10 2015 002 134

(51) Int. Cl.
*F16H 3/089* (2006.01)
*F16H 3/00* (2006.01)
*F16H 3/08* (2006.01)

(52) U.S. Cl.
CPC ............. *F16H 3/006* (2013.01); *F16H 3/089* (2013.01); *F16H 2003/0803* (2013.01);
(Continued)

(58) Field of Classification Search
CPC .. F16H 3/006; F16H 3/089; F16H 2003/0803; F16H 2003/0818;
(Continued)

(56) References Cited

U.S. PATENT DOCUMENTS

| 7,621,195 B2 * | 11/2009 | Hattori | F16H 3/006 |
| | | | 74/330 |
| 8,757,021 B2 * | 6/2014 | Singh | F16H 3/006 |
| | | | 74/330 |

FOREIGN PATENT DOCUMENTS

| CN | 101713448 A | 5/2010 |
| CN | 102047002 A | 5/2011 |

(Continued)

OTHER PUBLICATIONS

Notification of Transmittal of Translation of the International Preliminary Report on Patentability dated Aug. 24, 2017, in connection with corresponding international application No. PCT/EP2016/051108 (9 pgs.).

(Continued)

*Primary Examiner* — William C Joyce
(74) *Attorney, Agent, or Firm* — Maier & Maier, PLLC

(57) ABSTRACT

A dual clutch transmission for a motor vehicle, including gearwheel sets that can be shifted via shift elements, which form exactly eight gear stages which are assigned to a first sub-transmission and to a second sub-transmission. Each sub-transmission is provided with a joint drive shaft. The mutually coaxial input shafts can be alternately activated via a respective power-shiftable clutch, and the even forward gears are assigned to the first sub-transmission and the odd forward shifts are assigned to second transmission which can be switched over during gear shifting by the shift elements. The dual clutch transmission is provided with an intermediate gear stage which can be switched either to the first sub-transmission, or to the second sub-transmission.

7 Claims, 2 Drawing Sheets

(52) U.S. Cl.
CPC ............... *F16H 2003/0818* (2013.01); *F16H 2003/0822* (2013.01); *F16H 2003/0826* (2013.01); *F16H 2200/0078* (2013.01)

(58) Field of Classification Search
CPC ..... F16H 2003/0822; F16H 2003/0826; F16H 2200/0078
USPC ......................................................... 74/330
See application file for complete search history.

(56) References Cited

FOREIGN PATENT DOCUMENTS

| | | |
|---|---|---|
| CN | 103518081 A | 1/2014 |
| DE | 102011089167 A1 | 6/2013 |
| DE | 102012004096 A1 | 8/2013 |
| DE | 102012013248 A1 | 1/2014 |
| DE | 102012219437 A1 | 4/2014 |
| EP | 2 354 583 A1 | 8/2011 |
| WO | 9933682 A2 | 7/1999 |

OTHER PUBLICATIONS

International Search Report dated May 4, 2016 of corresponding International application No. PCT/EP2016/051108; 26 pgs.
Chinese Office Action dated Nov. 29, 2018, in connection with corresponding CN Application No. 201680009864.7 (10 pgs., including machine-generated English translation).

\* cited by examiner

Fig. 2

| G | K1 | K2 | RE-1 | RE-2 | RE-3 | RE-4 | RE-5 | RE-6 | RE-7 | RE-8 | SE-A | SE-B | SE-C | SE-D | SE-E | SE-F |
|---|----|----|------|------|------|------|------|------|------|------|------|------|------|------|------|------|
| 1 | X  |    |      |      |      |      | X    |      | X    | X    | re   | ii   |      |      |      |      |
| 1 |    | X  | X    | X    |      |      | X    |      |      |      |      |      | ii   |      |      |      |
| 2 |    | X  | X    | X    |      |      |      |      |      |      |      |      | ii   | re   |      |      |
| 3 | X  |    |      |      | X    |      | X    |      |      |      |      | ii   | ii   |      |      |      |
| 3 |    | X  |      | X    |      |      | X    |      |      |      | ii   |      |      | re   |      |      |
| 4 | X  |    |      |      | X    |      |      |      |      |      |      |      | re   |      |      |      |
| 5 |    | X  | X    |      |      |      |      |      |      |      | re   |      | re   |      |      |      |
| 6 | X  |    |      |      |      |      |      |      | X    |      | ii   |      | ii   |      |      |      |
| 7 | X  |    |      | X    |      |      |      |      |      | X    |      |      | re   |      |      |      |
| 8 |    | X  | X    | X    |      |      |      |      | X    | X    | re   | re   |      |      |      | ii   |
| 9 | X  |    |      |      |      | X    |      | X    |      |      | ii   |      |      |      | ii   | ii   |
| 10|    | X  |      |      |      | X    |      | X    |      |      |      | re   | ii   | ii   |      |      |
| 11| X  |    |      |      |      | X    |      |      |      |      |      |      |      | ii   |      |      |
| 12|    | X  |      |      |      |      |      |      |      |      |      |      | re   | ii   |      |      |

DUAL CLUTCH TRANSMISSION FOR A MOTOR VEHICLE

FIELD

The present invention relates to a dual clutch transmission for a motor vehicle according to the preamble of patent claim 1.

BACKGROUND

In addition to good efficiency, such dual clutch transmissions have among other advantages the advantage that they can be connected automatically, in particular without an interruption of the tractive power, wherein a transitional stage can be preselected already in the non-activated transmission, which is then activated with a change of the power-shiftable clutches. In this case, odd gears in a sub-transmission (1,3, 5, etc.) and the even gears in another sub-transmission (2, 4, 6, etc.) are positioned by means of the corresponding gearwheel sets which can be drivingly connected for example via synchronous clutches to the respective input shaft or output shaft.

The axial length of the dual clutch transmission depends on the number of the gearwheel sets or gear stages that are arranged in the axial direction one after another in the dual clutch transmission. Each of the gear stages consists of at least two fixed and/or loose gearwheels. Between the gear stages are arranged the shift elements, wherein upon their activation, forward and reverse gears can be connected.

A generic type of a dual clutch transmission is provided with gearwheel sets that are switchable via shift elements, which build in particular exactly eight gear stages. The gear stages are arranged respectively in a first sub-transmission and in a second sub-transmission. Each of the sub-transmissions is provided with an input shaft as well as with a common output shaft. The input shafts, which are arranged coaxially to each other, can be alternately activated by means of a power-shiftable clutch, wherein to the first sub-transmission are assigned the even forward gears, and to the second sub-transmission are assigned the odd gears, which can be connected via the switching element during a gear shift. The dual clutch transmission is in addition also provided with an intermediate gear stage, which can be shifted either to the first sub-transmission or to the second sub-transmission.

From DE 10 2012 004 096 A1 is known a dual clutch transmission wherein reverse gearwheels are formed with two reverse gearwheels arranged on a common reverse gear shaft.

SUMMARY OF THE DISCLOSURE

The object of the invention is to provide a dual clutch transmission which has a structurally favorable design and provides a greater degree of freedom in its functionality (shifting strategy) as well as in the design of the gear stages.

According present invention, two reverse gears arranged on a common reverse gear shaft are provided in order to form a reverse gear. The first reverse gearwheel can be coupled to a gear stage of one of the partial transmissions, while the second reverse gearwheel can be coupled to the intermediate gear stage. When the reverse gear is switched on, a torque flow from the gear stage of the activated sub-transmission can be transmitted to the intermediate gear stage and further to the output shaft.

In this manner, a separate reverse gear-gearwheel set, or a gear stage with only one reverse wheel set can be omitted. Instead of this, two gear stages which are already provided in any case are drivingly connected to each other via the reverse gear shafts and the two reverse gearwheels, and in particular in such a way that in addition to the regular forward gears, the reverse gears can be also realized. By eliminating a separate reverse gear-gearwheel set, either the overall structural length of the gear can be shortened, or another forward gear can be provided in this location.

In a technical implementation, the first reverse gearwheel can be rotationally mounted as a loose gearwheel on the reverse gear shaft and it can be coupled with a reverse gear switching element SE-H to the reverse gear shaft. The second reverse gearwheel can be arranged in a fixed manner as a fixed gearwheel on the reverse gear shaft.

In view of providing a simple driving connection with the gear stages, the first reverse gearwheel can mesh with the first drive-side gearwheel mounted on the first input shaft of the gear stage RE-2 of the first sub-transmission, while the second reverse gearwheel can mesh with the output-side gearwheel mounted on the output shaft on the intermediate gear stage.

The drive-side gearwheel on the gear stage RE-2 can be arranged non-rotatably on a drive-side hollow shaft of the first sub-transmission. The drive-side hollow shaft of the first sub-transmission can be coaxially and rotatably mounted on the first input shaft and it can be connected via a switching element SE-C to the first input shaft.

The output-side gearwheel of the intermediate gear stage can be mounted as a loose gearwheel on the output shaft and it can be drivingly coupled via a switching element SE-G to the output shaft. In this case, the reverse gear can be formed by shifting the shift elements SE-C, SE-H and SE-G.

The intermediate gear stage can directly adjoin the first sub-transmission in the axial transmission. In this case, the intermediate gear stage can be coupled by means of a switching element SE-D either to the first sub-transmission, or by means of a switching element SE-B to the second sub-transmission.

Alternatively or additionally to the aspects of the invention mentioned above, the intermediate gearwheel which can be shifted to both sub-transmissions can be loosely mounted with its drive-side gear wheel on the second input shaft, and by means of the switching element SE-D mentioned above it can be coupled to the drive-side hollow shaft of the first sub-transmission. In the axial direction opposite the switching element SED, the drive-side gearwheel of the intermediate gear stage can be coupled with another switching element SE-B to the second sub-transmission.

In a technical realization, the first input shaft is provided with precisely one switching element SE-C mentioned above, which can shifted on both sides in the axial direction of the switching element (for example a double synchronizing clutch). Accordingly, the second input shaft is also provided with precisely one switching element SE-A switchable on both sides (for example a double synchronizing clutch) by means of which the second input shat can be coupled to the gear stage of the second sub-transmission. By means of the switching element SE-C which is arranged in the first sub-transmission, either a drive-side loose gearwheel of the first plane, or the already mentioned drive-side hollow shaft of the first sub-transmission can be coupled to the first input shaft. The drive-side hollow shaft, which is rotatably mounted on the first input shaft, can support at least one, preferably two drive-side fixed gearwheels, which are respectively assigned to a second gear stage and to a third gear stage.

In addition, on the drive-side hollow shaft of the first sub-transmission can be additionally loosely mounted a drive-side gearwheel of a fourth gear stage. To provide a driving connection with the drive-side hollow shaft, it can be provided with the switching element SE-D mentioned above, by means of which the loosely mounted drive-side gearwheel of the fourth wheel level can be coupled to the hollow shaft.

The switching element SE-A, which is directly supported by the second input shaft, is preferably switchable on both sides (for example as a double synchronizing clutch). In this case, a drive-side loose gearwheel of an eighth gear plane supported on the second input and a hollow shaft coaxially mounted on the second input shaft can be arranged in the axial direction on both sides of the second shifting element in the second sub-transmission. The drive-side hollow shaft of the second sub-transmission and the upper loose gearwheel of the eighth gear stage can be alternately coupled (via the switching element SE-A) to the second input shaft. The hollow shaft of the second sub-transmission preferably supports a drive-side fixed gearwheel of the seventh gear stage, as well as a drive-side loose gearwheel of the sixth gear stage. In order to shift the drive-side loose gearwheel of the sixth gear stage, the hollow shaft can be coupled via another switching element SE-B to the drive-side loose gearwheel of the sixth gear stage.

In a preferred embodiment variant, the drive-side loosely mounted gearwheel can be additionally coupled also by means of the switching element SE-B to the hollow shaft on both switchable intermediate gear stages of the second sub-transmission.

In a technical realization, the output shaft is arranged axially parallel to the input shafts and to the reverse gear shaft. It is preferred when the drive-side gearwheels on the first and on the second gear stage are arranged non-rotatably on a drive-side hollow shaft which is rotatably mounted coaxially on the drive shaft. The drive shaft can be additionally provided with a switching element SE-F, by means of which the drive-side hollow shaft or the output-side gearwheel of the third gear stage can be alternately coupled to the output shaft in the first sub-transmission.

In a similar manner as in the first sub-transmission, the output-side gearwheels of the seventh and eighth gear stage can be arranged non-rotatably also in the second sub-transmission on a hollow shaft which is rotatably mounted in coaxial manner on the drive shaft. The hollow shaft which is rotatably mounted in the second sub-transmission on the output shaft can be coupled by means of a sixth, one-sided switching element SE-E to the drive shaft.

In one embodiment variant, the drive side gearwheel of the intermediate gear stage RE-5 which is switchable to both sub-transmission can be arranged in a rotationally fixed manner as a fixed gearwheel on the drive shaft. In this case, the intermediate wheel level would be constantly rotated along during the driving operation and the rotary bearings would eventually wear out prematurely. Against this background the drive-side gearwheel of the fifth gear stage can be also mounted loosely on the drive shaft and it can be coupled via a switching element SE-G to the output shaft.

It is preferred when the intermediate gear stage or the intermediate gearwheel set RE-5 form at least the 3rd forward gear of the sub-transmission, which can be selectively drivingly connected directly or indirectly to the input shaft of the one or of the other sub-transmission A, B. The result is that in addition to the regular shifting strategy, a variant can be obtained in which the 1st gear can be switched to the 3rd gear and when required, switching to the 5th gear can be performed without an interruption of the tractive force.

If in the case of a corresponding technical design of the transmission, said gearwheel set is also incorporated in the power flow of the 1st forward gear, and the sub-gear can be changed also here, which will result in an addition degree of freedom with respect to the functionality.

Finally, twelve forward gears can be switched with little effort by means of five dual clutches and a simple clutch, wherein four dual clutches are positioned on both coaxially arranged input shafts of the sub-transmission, and a dual clutch as well as a simple clutch are positioned on the common output shaft.

BRIEF DESCRIPTION OF THE DRAWING

An embodiment of the invention is described in more detail in the following in the attached figures. The figures show the following:

FIG. 2 shows a switching matrix of the speed-change gearbox according to FIG. 1.

DETAILED DESCRIPTION OF THE DRAWING

Figure 1:
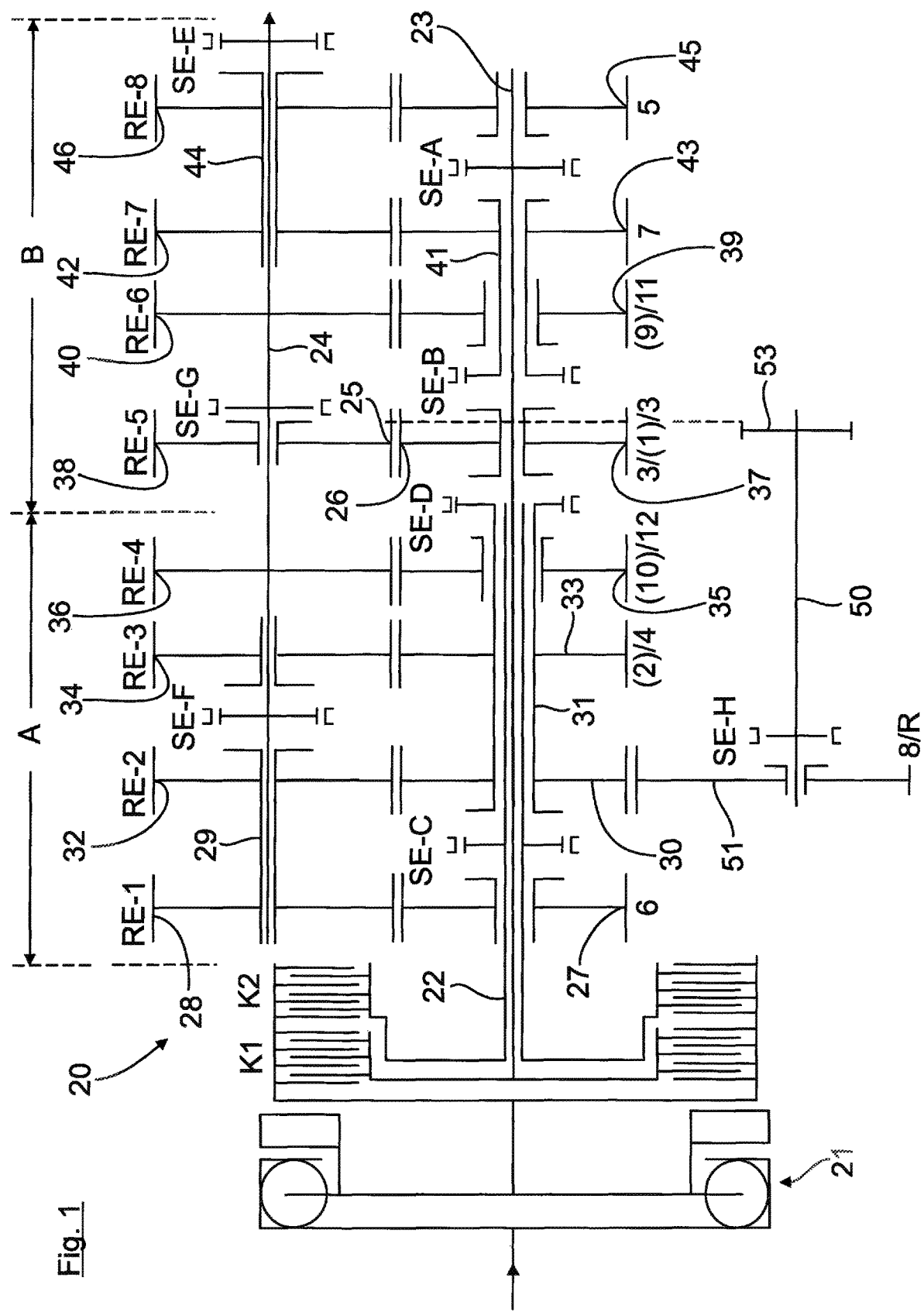
FIG. 1 shows a block diagram of a speed-change gearbox for motor vehicles, provided with two sub-transmissions which can be activated via two power-shiftable clutches and with 12 shiftable forward gears, wherein one gearwheel set of the transmission can be used for both sub-transmissions.

FIG. 1 shows a speed-change gearbox or a dual clutch transmission 20 for a motor vehicle, by means of which eight gear stages or eight gearwheel sets RE-1 through RE-8 can be shifted to twelve forward gears 1 through 12. Each of the gear stages RE-1 through RE-8 consists of a drive-side gearwheel which is coaxial to an input shaft 22, 23, and an output-side gearwheel which is coaxial to the output shaft 24.

The speed-change gearbox 20 is provided with two input shafts 22, 23 which can be coupled for example to an internal combustion engine (not shown), and a torsional vibration damper 21 which can be drivingly coupled alternately via two power-shiftable clutches K1, K2, among which the input 22 is a hollow shaft by means of which the second input shaft 23 is controlled. The pivot bearing and the corresponding gear housing are not shown in the figure.

The gearwheel sets or gear planes RE-1 through RE-8 are arranged in a per se known manner by means of shiftable loose gears and fixed gearwheels on the input shafts 22, 23 and on a common output shaft 24 in a manner to be described later, wherein the gearwheels sets RE-1 through RE-4 form a first sub-transmission A, and the gearwheel sets RE-5 through RE-8 form a second sub-transmission B.

The gearwheel set RE5 of the sub-transmission B is arranged with a fixed gearwheel 38 on the output shaft 24 and a switchable loose gearwheel 26 is arranged axially immediately adjacent to the sub-transmission A on the input shaft 23 in such a way, that this loose gearwheel 27 can be coupled via a shifting clutch SE-D either with the sub-transmission A, or via a shifting clutch SE-B to the sub-transmission B.

The arrangement of the remaining gearwheel sets, wherein 12 forward gears can be realized with only eight gearwheel sets RE-1 through RE-8, is as follows:

the loose gearwheel 27 of RE-1 on the input shaft 22 and its fixed gearwheel 28 are arranged in a rotationally fixed manner on a hollow shaft 29 which is mounted coaxially to the output shaft 24;

a fixed gearwheel 30 of RE-2 is mounted via a hollow shaft 31 on the input shaft 22 and the corresponding fixed gearwheel 32 is also arranged on the hollow shaft 29 in a fixed manner;

the loose gearwheel 27 and the hollow shaft 31 can be coupled alternately to the input shaft 22 by means of a shifting clutch SE-C;

a fixed gearwheel 33 of RE-3 is arranged on the hollow wheel 31, while its loose gearwheel 34 or the hollow shaft 29 can be alternately coupled via a shifting clutch SE-F to the drive shaft 24;

on the hollow shaft 31 is further mounted a loose gearwheel 35 of the gearwheel set RE-4, which meshes with a fixed gearwheel 36 on the output shaft 24;

the loose gearwheel 37 of the gearwheel assembly RE-5 is mounted axially adjacent directly on the central input shat 23 of the sub-transmission B, which is in engagement with the other fixed gearwheel 38 on the output shaft 24;

both loose gearwheels 35, 37 can be alternately coupled via another shifting clutch SE-D to the hollow shaft 31 on the input shaft 22;

in addition, the loose gearwheel 37 can be coupled via a second shifting clutch SE-B to a hollow shaft 41 which is mounted on the input shaft 23, wherein the hollow shaft 41 supports a loose gearwheel 39 of the gearwheel set RE-6, which can be also coupled via the shifting clutch SE-B to the hollow shaft 41;

the loose gearwheel 39 of the gearwheel set RE-6 meshes with one other fixed gearwheel 40 on the output shaft 24;

the hollow shaft 41 is further provided with a fixed gearwheel 43 of the gearwheel set RE-7, which is engaged by a fixed gear 42 on a hollow shaft 44 rotatably supported on the output shaft 24;

the hollow shaft 41 on the input shaft 23 can be further connected via a shifting clutch SE-A t the input shaft 23, wherein the shifting clutch SE-A is alternately coupling also to a loose gearwheel 45 of the gearwheel set RE-8 to the input shaft 23;

the fixed wheel 46 of the gearwheel RE-8 is arranged analogously to the fixed gearwheel 42 of the RE-7 on the hollow shaft 44, wherein the hollow shaft 44 can be connected via a simple shifting clutch SE-E to the drive shaft 24.

The shifting clutches SE-C, SE-F, SE-D, SE-B and SE-A can be designed as known dual synchronous clutches which are common with switching clutches (wherein one position of their switching sleeves is shown in FIG. 1 on the left (Ii), or on the right (re), and the switching clutch SE-E is designed as a simple synchronizing clutch (switching position Ii), which are controlled electronically via a corresponding electrically/hydraulically actuated actors that are each time switched from a neutral position (as shown).

The clutches K1, K2 can be hydraulically power-shiftable lamellar clutches, which alternately actuate the sub-transmission A or B according to the corresponding preselection of the gear for coupling in the drive force flow.

The forward gears 1 through 12, (a potentially required reverse gear is not shown to simplify the description), can be connected according to shift matrix of FIG. 2, wherein each respective connected gear (G) 1 through 12 is indicated in the left column of the matrix. The symbols (X) denote gearwheel sets RE1 to RE8 which are integrated into the force flow, and the designation (Ii) or (re) indicates the shift positions of the respective shift clutches SE. It should be noted that the gears 1 and 3 are indicated in the column G twice, since these gears can be connected selectively via the sub-transmission B (clutch K1), or via the sub-transmission A (clutch K2).

The regular shifting sequence can be accordingly 1-2-3-4-5, ff., wherein the first gear is carried out via the clutch K1 (sub-transmission B), and the other gears are realized via alternately closing the clutches K2, K1, K2, etc. In the sub-transmission with the open clutch, the next gear can be preselected in a known manner, wherein switching over between the clutches K1, K2 can be carried out without interrupting the tractive force.

In the modified shift sequence, the second gear, and if appropriate also the fourth gear, can be skipped without interrupting the tractive force, so that the force flow in the first gear takes place via the clutch K1 or K2 (sub-transmission A or B) with a corresponding integration of the gearwheel sets RE-1 through RE-8 and of the position of the shifting clutches SE (see the matrix). As a result, the third gear, and when appropriate also the fifth gear, is already preselected and can be activated by changing the power-shiftable clutch without interrupting the tractive force.

Therefore, in addition to the regular switching sequence of the dual clutch transmission 20, the modified sequences 1-3-4-5-6 ff., can be controlled in the sequence K2, K1, K2, K1, K2 ff. or 1-3-5-6 ff., in the sequence K1, K2, K1, K2 ff., wherein the switching sequences can be preset and/or manually adjusted depending on the operating data and driving parameters of the motor vehicle by means of an electronic transmission control.

As can be further seen from the FIG. 2, the forward gears 3 through 8 as well as 11 and 12 are designed as direct gears, wherein each is provided with exactly with one gear stage connected in the torque flow. In contrast to this, the forward gears 1, 2 and 9 as well as 10 are realized not as direct gears, but as twist gear in which by means of shift element SE-A through SE-G, exactly three respective gear stages are combined in series and connected into the torque flow. The first, second and third gear state RE-1, RE2, RE3 are connected in the torque flow in the 2nd forward gear (twist gear). In the 9th forward gear (twist gear) are connected the eighth, seventh and sixth gear stages RE-8, RE-7, RE-6. With an engaged 10th forward gear (twist gear), the first, second and fourth gear stages RE-1, RE-2 and RE-4 are connected.

In order to provide the respective twist-forward gears 1, 2 and 9 as well as 10, the three gear stages to be shifted are either completely assigned to the first sub-transmission A, or completely assigned to the second sub-transmission B. This means that with a connected twist gear, sub-transmissions provided with only the three twist gear stages are integrated into the torque flow of the engaged gears, while the other sub-transmissions are fully decoupled from the torque flow.

In order to form a reverse gear R, a reverse gear 50 bridging over the two partial transmissions A, B is mounted parallel to the input shafts 22, 23 as well as the output shaft 24 of one of both sub-transmissions A, B in the transmission housing (not shown) of the dual clutch transmission. The reverse gear shaft 50 supports two reverse gearwheels 51, 53, of which the first reverse gearwheel 51 meshes with the drive side gearwheel 30 of the second gear stage RE-2, and the second reverse gearwheel 53 meshes with the drive-side gearwheel 37 of the fifth gear stage RE-5.

The first reverse gear 51 cooperating with the second gear stage RE-2 of the sub-transmission is designed as a loose gear and it can be coupled by means of a shift element SE-H, which is shiftable on one side to the reverse gear shaft 50. The reverse gear 53, which is cooperating with the fifth gear stage RE-5, is on the other hand designed as a fixed gearwheel.

The reverse gear R is activated by shifting the shift element SE-C supported by the first input shaft 22 shown in FIG. 1 to the left to the drive-side gearwheel 30 of the first gear stage RE-1. In addition, the shift element SE-H is shifted to the left to the first reverse gearwheel 51, and the drive-side gearwheel 38 of the intermediate gear stage RE-5 is coupled via the shift element SE-G to the drive shaft 24. The reverse gear R is therefore a twist gear, wherein the torque flow is transmitted with the clutch K2 closed via the hollow input shaft 22 and the drive-side gearwheel 30 of the second gear stage RE-2 to the first reverse gearwheel 51, and further via the reverse gear shaft 50 as well as the second reverse gearwheel 52 to the drive-side gearwheel 38 of the intermediate gear state RE-5.

The invention claimed is:

1. A dual clutch transmission comprising:
   gearwheels switchable via shift elements, wherein exactly eight of them are arranged in the axial direction from the input side to the output side of the dual clutch transmission in a sequence forming from the first to the eight gear stage, which are respectively assigned to a first sub-transmission and to a second sub-transmission, wherein the first sub-transmission is provided with a first input shaft and the second sub-transmission is provided with a second input shaft, and both sub-transmissions are provided with a joint output shaft, wherein each of the input shafts arranged coaxially to each other alternately activated via a power-switchable clutch, and at least some of the even forward gears are assigned to the first sub-transmission and at least some of the odd forward gears are assigned to the second sub-transmission, which shifted with a gear shifting via the switch elements, wherein at least one intermediate gear stage is shiftable to both the first sub-transmission and to the second sub-transmission, wherein a rear gear is formed by a rear gear shaft, which is axially parallel to the input shafts on which two reverse gearwheels are provided, among which the first reverse gearwheel coupled to a gear stage of the first sub-transmission, and the second reverse gear coupled to the intermediate gear stage, and wherein with an engaged rear gear, a torque flow can thus be transmitted from the gear stage coupled to the first reverse gearwheel via the first reverse gearwheel, the rear gear shaft and the second reverse gearwheel to the intermediate gear stage and further to the output shaft, the first reverse gearwheel meshes with a drive-side gearwheel of at least one gear stage of the first sub-transmission mounted on the first input shaft, and the second reverse gearwheel meshes with the drive-side gearwheel of the intermediate gear stage mounted on the output shaft, and the drive-side gearwheel, which is coupled to the first reverse gearwheel, is arranged non-rotatably on a drive-side hollow shaft of the first sub-transmission, which is coaxially rotatably mounted on the first input shaft, and the drive-side hollow shaft of the first sub-transmission is connected via a shift element to the first input shaft.

2. The dual clutch transmission according to claim 1, wherein the first reverse gearwheel is rotatably mounted as a loose gearwheel on the rear gear shaft and is coupled with a reverse gear shift element to the rear gear shaft, and that the second reverse gearwheel is arranged as a fixed gearwheel on the rear gear shaft.

3. The dual clutch transmission according to claim 1, wherein the drive-side gearwheel of the intermediate gear stage is mounted as a loose gearwheel on a drive shaft and is drivingly connected via a shift element to the drive shaft, so that the rear gear is engaged by shifting the shift elements.

4. The dual clutch transmission according to claim 1, wherein the intermediate gear stage is in the axial direction directly adjacent to the first sub-transmission, and is drivingly connected by a shift element either with the first sub-transmission, or by a shift element with the second sub-transmission.

5. The dual clutch transmission according to claim 1, wherein the intermediate gear stage, which can be switched to both sub-transmissions, is loosely mounted with its drive-side gearwheel on the second input shaft, and the drive-side gearwheel, which can be switched to both sub-transmissions, can be drivingly connected to the intermediate gear stage by a shift element with the drive-side hollow shaft of the first sub-transmission.

6. The dual clutch transmission according to claim 5, wherein the drive-side gearwheel of the intermediate gear stage can be drivingly connected with another shift element to the second sub-transmission.

7. The dual clutch transmission according to claim 1, wherein the drive shaft is arranged axially parallel to the input shafts and to the rear gear shaft.

* * * * *